United States Patent
Mitarai

(10) Patent No.: US 9,017,754 B2
(45) Date of Patent: Apr. 28, 2015

(54) METHOD FOR PRODUCING HEN EGG

(75) Inventor: Kaoru Mitarai, Oita (JP)

(73) Assignee: Meisho, Co., Ltd., Oita (JP)

( * ) Notice: Subject to any disclaimer, the term of this patent is extended or adjusted under 35 U.S.C. 154(b) by 0 days.

(21) Appl. No.: 14/240,680

(22) PCT Filed: Aug. 24, 2012

(86) PCT No.: PCT/JP2012/071470
§ 371 (c)(1),
(2), (4) Date: Feb. 24, 2014

(87) PCT Pub. No.: WO2013/031691
PCT Pub. Date: Mar. 7, 2013

(65) Prior Publication Data
US 2014/0205738 A1    Jul. 24, 2014

Related U.S. Application Data

(60) Provisional application No. 61/527,660, filed on Aug. 26, 2011.

(51) Int. Cl.
| A23L 1/32 | (2006.01) |
| A23K 1/00 | (2006.01) |
| A23K 1/16 | (2006.01) |
| A23K 1/17 | (2006.01) |
| A23K 1/18 | (2006.01) |

(52) U.S. Cl.
CPC ............ *A23K 1/008* (2013.01); *A23K 1/1646* (2013.01); *A23K 1/17* (2013.01); *A23K 1/1826* (2013.01); *A23L 1/32* (2013.01); *A23K 1/009* (2013.01)

(58) Field of Classification Search
CPC .............................. A23L 1/32; A23K 1/1826
USPC ........................................ 426/614; 424/234.1
See application file for complete search history.

(56) References Cited

U.S. PATENT DOCUMENTS

| 8,454,979 B2 * | 6/2013 | Mitarai et al. ............. 424/282.1 |
| 2006/0008512 A1 * | 1/2006 | Hooge .......................... 424/442 |
| 2012/0039946 A1 | 2/2012 | Mitarai et al. |

FOREIGN PATENT DOCUMENTS

| JP | H08-56585 A | 3/1996 |
| JP | H08-266230 A | 10/1996 |
| JP | H08-333263 A | 12/1996 |
| JP | H09-56337 A | 3/1997 |
| JP | 2002-330707 A | 11/2002 |
| JP | 2005-27591 A | 2/2005 |
| JP | 2005-073651 A | 3/2005 |
| JP | 4302895 B | 5/2009 |

OTHER PUBLICATIONS

English Translation for JP 9-56337 published Mar. 1997.*
Radu-Rusu et al. Lucrari Stiintifice. vol. 53. Jun. 2010.*

* cited by examiner

*Primary Examiner* — Anthony Weier
(74) *Attorney, Agent, or Firm* — Haynes and Boone, LLP

(57) ABSTRACT

The object of the invention is to enable production of high quality eggs in poultry and to provide a method for improving productivity thereof. The invention provides a method for producing a hen egg having improved quality and productivity, the method characterized in having a step for feeding a hen on supplemented feed obtained by adding to poultry feed an immunostimulating substance produced by cytolysis that accompanies sporulation of MRE symbiotic bacteria and/or on supplemented drinking water obtained by adding the immunostimulating substance to drinking water, wherein the immunostimulating substance is obtained by culturing the MRE symbiotic bacteria, leaving the resulting culture fluid in a depleted state to thereby cause the symbiotic bacteria to convert to endospores, and removing impurities including the endosporic symbiotic bacteria from the culture fluid.

5 Claims, No Drawings

METHOD FOR PRODUCING HEN EGG

CROSS REFERENCE TO RELATED APPLICATIONS

This application claims priority under 35 U.S.C. 119 based upon Japanese Patent Application Serial No. 2006-273382, filed on Oct. 4, 2006. The entire disclosures of the aforesaid applications are incorporated herein by reference.

FIELD OF THE INVENTION

The present invention relates to poultry feed and a method for producing a hen egg. Particularly, the present invention relates to a method for obtaining a high quality hen egg having improved productivity.

BACKGROUND OF THE INVENTION

Feed has conventionally been improved in various ways in order to enhance the quality of eggs of poultry including chickens. For example, attempts have been made to improve quality and productivity of eggs including a survival rate of chickens, an egg-laying rate, the Haugh unit of eggs and eggshell strength by adding to feed e.g., vitamin B6 and substances having antioxidative effects such as tea extracts, polyphenol, isoflavon agricons and plum vinegars (See Patent Literatures 1-5).

PRIOR ART LITERATURE

Patent Literature

Patent Literature 1: Japanese Patent Application Kokai Publication No. H08-56585
Patent Literature 2: Japanese Patent Application Kokai Publication No. H08-266230
Patent Literature 3: Japanese Patent No. 4302895
Patent Literature 4: Japanese Patent Application Kokai Publication No. 2002-330707
Patent Literature 5: Japanese Patent Application Kokai Publication No. 2005-73651

SUMMARY OF THE INVENTION

All of the abovementioned conventional methods are based on the principle that feed is eutrophicated by adding nourishing substances containing antioxidative nutriments to thereby increase nutritive values of eggs produced by chickens that ate the eutrophicated feed. In other words, those methods simply increase nutritive values of eggs by feeding hens on feed having highly nutritive values but not enhance the hens' natural ability of laying eggs (e.g., increased ability of laying eggs having highly nutritive values and increased ability of producing high quality eggs).

The present invention has been designed in view of the abovementioned circumstance, and the object of the present invention is to provide a method for producing high quality eggs and enhancing productivity thereof without significantly changing conventional feed, breeding methods, etc. in raising poultry for egg production. Moreover, the object of the present invention is to provide a method for producing high quality eggs and enhancing productivity thereof by adding the immunostimulating substance according to the present invention to not only poultry feed but drinking water as well.

The present invention is based on the finding that an immunostimulating substance produced by cytolysis that accompanies sporulation of MRE symbiotic bacteria enhances the life force of poultry to thereby effectively solve the abovementioned problems. The present inventors found that when they diluted an immunostimulating substance produced by MRE symbiotic bacteria about 1000-fold and had chickens drink it, chickens that had stopped laying eggs started laying eggs again and the Haugh unit and eggshell strength of those eggs were markedly improved and that chickens became less susceptible to infectious diseases during breeding and the rate of dead chickens dramatically declined.

Accordingly, a first major aspect of the present invention provides a method characterized in producing a hen egg having improved quality and productivity, the method comprising feeding a hen on supplemented feed obtained by adding to poultry feed an immunostimulating substance produced by cytolysis associated with spore formation of MRE symbiotic bacteria group and/or on supplemented drinking water obtained by adding the immunostimulating substance to drinking water, wherein the immunostimulating substance is obtained by incubating the MRE symbiotic bacteria group, placing a resultant culture medium under a starvation condition, thereby causing the symbiotic bacteria group to internally sporulate, and removing from the culture medium impurities containing the internally sporulated bacteria group.

The abovementioned constitution enables to markedly improve quality of eggs produced by chickens as well as productivity thereof Moreover, the present invention can reinforce chickens' natural immunity, resulting in increased antibacterial, antiviral and antifungal effects. As a result, the chickens' natural ability of laying eggs can be enhanced.

Moreover, according to one embodiment of the present invention, in such a method, the abovementioned improved quality is improved Haugh unit, yolk height and eggshell strength.

Moreover, according to another embodiment of the present invention, in such a method, the abovementioned improved productivity is an improved dead chicken rate, an enhanced egg-laying rate and a reduced egg breakage rate.

Moreover, according to another embodiment of the present invention, in such a method, the abovementioned hen is selected from the group consisting of White Leghorn, Sakura, Momiji, ISA Brown, Dekalb Warren Sexalink, Harvard Comet, Shaver Starcross, Hisex Brown, Hyline Brown, Yellow Plymouth Rock, Rhode Island Red, Hoshino Cross, Norin Cross, Nagoya Cochin, Rock Horn, White Plymouth Rock, Minorca, Araucana and Silky Fowl.

Moreover, according to another embodiment of the present invention, in such a method, the abovementioned immostimulating substance is added to the drinking water by a fluid delivery device.

A second major aspect of the present invention provides poultry feed obtained by adding an immunostimulating substance produced by cytolysis associated with spore formation of MRE symbiotic bacteria group, wherein the immunostimulating substance is obtained by incubating the MRE symbiotic bacteria group, placing a resultant culture medium under a starvation condition, thereby causing the symbiotic bacteria group to internally sporulate, and removing from the culture medium impurities containing the internally sporulated bacteria group.

Furthermore, a third major aspect of the present invention provides an egg produced by the abovementioned method.

Other features and marked effects of the present invention other than those described above will become apparent to those skilled in the art by referring to the following detailed description of the invention.

DETAILED DESCRIPTION OF THE INVENTION

A description of one embodiment and several examples according to the present invention is given below.

As described above, the present invention enables to produce hen eggs having improved quality and productivity by adding to poultry feed and drinking water an immunostimulating substance produced by cytolysis that accompanies sporulation of MRE symbiotic bacteria and then feeding chickens on the supplemented feed and drinking water. In other words, the present invention is different from a conventional method in which nutrition is supplemented by mixing nutritional supplements with feed in that the invention enables to reinforce the chickens' natural ability of laying eggs and thereby produce high quality eggs simply by diluting an immunostimulating substance originated from MRE in a proper manner and then adding it to feed, drinking water, etc.

Unlike a conventional method in which nourishing substances containing antioxidative nutriments are mixed with feed, the present method establishes poultry technology that improves egg quality including the reduced number of chickens that die of diseases, an improved egg-laying rate, a marked increase of Haugh unit, and increased eggshell strength and yolk height by a method of activating chickens' natural immunity. The method according to the present invention simply requires providing a small amount of an MRE-derived immunostimulating substance, which is a natural immunity activating substance, and therefore high quality hen eggs can be produced simply by diluting and mixing the substance with chickens' drinking water.

When an MRE-derived immunostimulating substance, which is a natural immunity activating substance, is provided, production of so-called SOS materials, i.e., interferon-alpha and interferon-beta, which are type I interferons, is activated. Then, secretion of various antimicrobial substances including alpha-defensin and beta-defensin from phagocytes such as epithelial cells and neutrophils is activated to thereby reinforce antimicrobial force against pathogenic germs such as viruses, bacteria and fungi. Accordingly, a reduced dead chicken rate can be achieved.

Table 1 shows the result of measuring production of type I interferons by an MRE-derived immunostimulating substance by using human blood. Since the body temperature of chickens is significantly higher than human, it is believed that the amount of type I interferons and antimicrobial substances released as a result of stimulation by type I interferons is by far more in chickens than in human.

TABLE 1

Secretion of type I interferon by MRE immunostimulating substance
Production of type I IFN-alpha (pg/mL)

| Test subject | Control | 6.00% dilution of MRE | Ratio |
|---|---|---|---|
| A female 51 | 1.0 | 4.2 | 4.2 |
| B female 54 | 4.1 | 21.1 | 5.1 |
| C male 72 | 7.8 | 14.3 | 1.8 |
| D male 25 | 4.7 | 11.2 | 2.4 |
| Average | 4.4 | 12.7 | 2.89 |

There seems to be two reasons why the activation of chickens' natural immunity results in increased egg-laying rate, Haugh unit, eggshell strength and yolk height.

The first reason is that the body temperature of birds including chickens is extremely higher than that of mammals. By way of example, the normal body temperature of human is about 36.5° C. while that of chickens is as high as about 42° C. The normal body temperatures of other mammals are equal to or lower than 39° C. As to the body temperature, 42° C. is on the risk level for human.

It has been known that a mechanism referred to as autophagy works as part of natural immunity, wherein deteriorated cell organelles are decomposed by a lysosomal enzyme as a result of molecular-level switching. For example, a mechanism of decomposing a deteriorated ill-efficient mitochondrion by a lysosomal enzyme and then replacing it with a new mitochondrion has been proven. It has been known that the lysosomal enzyme becomes active in high-temperature regions. Its decomposing ability becomes maximum at 40° C. to 65° C. at which the decomposing ability of normal digestive enzymes dramatically declines. Accordingly, a lysosomal enzyme actively works in birds more than in mammals because of the action of an MRE-derived immunostimulating substance to thereby increase the decomposing ability. In other words, the high body temperature of chickens is the reason why the effect of an MRE-derived immunostimulating substance is enhanced.

The other reason is related to the fact that a large number of mitochondria are contained in one egg cell. It is believed that the number of mitochondria contained in one muscular cell is 500-2000. On the other hand, the number of mitochondria contained in one egg cell is believed to be several tens of thousands to two hundred thousand. The fact that one egg cell contains an extremely large number of mitochondria, which are energy factories for producing ATP, suggests that a tremendous amount of energy is required for giving birth to life.

The MRE-derived immunostimulating substance according to the present application not only activates a natural immune system but also decomposes and removes deteriorated and poorly-operating mitochondria within an egg cell and promotes the reproduction of young mitochondria. A chicken's ovary normally has about 30,000 egg cells, and a matured egg cell is laid as an egg, wherein one hen usually lays 300-320 eggs and is culled when the egg-laying rate drops. When a MRE-derived immunostimulating substance is given to mitochondria within an egg cell, ATP synthesis is activated by young mitochondria and the life force of the egg cell increased so that the egg-laying rate is improved and a high quality egg produced.

A hen egg produced by the method of the present invention has increased Haugh unit, eggshell strength and yolk height and can keep more freshness than normal hen eggs.

The "immunostimulating substance" according to the present invention can be obtained by decomposing cells of MRE symbiotic bacteria, which are aerophilic bacteria, to a low molecular range of 3000 Da or below (preferably 1000 Da to 300 Da) with mother cell lytic enzymes, lysosomal enzymes or the like.

The MRE symbiotic bacteria comprises Bacillus sp. (FERM BP-11209, ID No. MK-005), Lysinibacillus fusiformis (FERM BP-11206, ID No. MK-001), Bacillus sonorensis (ID No. MK-004), Lysinibacillus sp. (FERM BP-11207, ID No. MK-002), and Comamonas sp. (FERM BP-11208, ID No. MK-003), wherein all of them are aerophilic bacteria.

In the present invention, MRE symbiotic bacteria are cultured and then converted to endospores (sporulation) to thereby induce mother cell lytic enzymes, resulting in decomposition of cells into low molecules. More specifically, liquid culture is first performed for culture liquid of MRE symbiotic bacteria under the culture conditions of pH 6.0-6.8, a temperature of 25-30° C. and 0.1-1.0 mg/L in concentration of dissolved oxygen by aeration. Nourishing substances given to bacterial cells include fish powder, rice bran, oil cake, bouillon, and minerals including magnesium sulfate and silica. In the case of mixed bacteria, it should be waited until a stable symbiotic relationship is established in the mixed bacteria.

After the bacterial culture is stabilized, the bacterial in a vegetative cell state are transferred to another aeration culture tank, and then culture is continued. Next, while aeration is continued in the transferred aeration culture tank, all nourishing substances except silica are discontinued to place the bacteria in a depleted state. Around the time when the remaining nourishing substances are consumed, depletion of nitrogen components triggers sporulation (conversion to endospores), and liquid gradually becomes transparent. After confirming the completion of sporulation, aeration (supply of oxygen) is stopped and the culture liquid allowed to stand for a while, and then spores (endospores) starts precipitating all at once to give a supernatant liquid. By filtrating the supernatant liquid thus obtained with a membrane of 0.2 μm, an extremely small amount of remaining culture cells as well as remaining floating endospores (spores) are removed to give an undiluted liquid of an immunostimulating substance, which becomes a ligand for natural immunity of poultry. If need be, the liquid may be filtrated with a filter of 0.02 μm. In the method according to the present invention, all of the supernatant liquid, the liquid obtained by membrane filtration, and filtration with a filter of 0.02 μm can be used.

By way of example, a 1m³ culture liquid of MRE symbiotic bacteria (MK-001, MK-002, MK-003, MK-004 and MK-005) is placed in each of two 1.2 m³ culture aeration vessels of the same shape and then aeration is performed such that the concentration of dissolved oxygen becomes 0.5-1.2 mg/L. One of those vessels is referred to as a culture cell tank and the other as a sporulation tank. To the culture cell tank, we added 500 g of fish powder, 500 g of rice bran, 250 g of oil cake and 50 g of bouillon as minimum nourishing substances and continued culture by performing aeration under the conditions of pH 6.0-6.8 and a culture temperature of 25-35° C. On the other hand, in the sporulation tank, all of nourishing substances were discontinued to place the liquid in a depleted state and aeration continued at 25-35° C., and then depletion of nitrogen components triggered sporulation. After waiting until the culture liquid became more and more transparent, aeration (supply of oxygen) was stopped and then endospores started precipitating all at once to give a transparent solution. This solution was filtrated with a membrane of 0.2 μm, further filtrated with a filter of 0.02 μm and then put back to the sporulation tank that had been well washed. Here, the liquid obtained by removing remaining mother cells and spores with a filter from a liquid in which MRE bacteria was converted to endospores is referred to as an MRE filtrate. Accordingly, the MRE filtrate contains no bacteria or spores, yet the MRE filtrate contains an immunostimulating substance. The present invention utilizes this immunostimulating substance.

In the present invention, the sizes of membranes and filters used in the abovementioned solution are not particularly limited. By way of example, the size of membranes may be 1 μm, 0.7 μm, 0.5 μm, 0.3 μm or the like and is preferably 0.2 μm. The size of filters may be 0.15 μm, 0.1 μm, 0.07 μm, 0.05 μm, 0.03 μm or the like and is preferably 0.02 μm.

In the present invention, we used the abovementioned culture cell tank and sporulation tank, performed aeration such that the concentration of dissolved oxygen became 0.5-1.2 mg/L in both tanks, and then conducted the following experiment.

A solution whose raw material is MRE containing the immunostimulating substance thus obtained, which activates natural immunity, is mixed with drinking water for poultry 1-fold to 1000-fold, preferably 100-fold to 500-fold, and more preferably 1000-fold to 3000-fold, yet its concentration is not particularly limited as far as preferable effects can be achieved. More specifically, since the amount of water drunk by one chicken a day is about 300 mL, a solution containing 0.03-0.6 mL and preferably 0.1-0.15 mL per chicken of the abovementioned MRE as a raw material is mixed with or infused in 300 mL of drinking water. For example, given that the number of hens is 10,000, 1-1.5 L of the abovementioned solution may be mixed with or infused in 3000 L of drinking water. Moreover, a solution containing the immunostimulating substance according to the present invention can be added to drinking water by using a fluid delivery device, wherein the adjustment of concentration by infusion only requires replacing an infusion bag, and therefore the present method is very efficient.

In a conventional method (e.g., a method of using plum vinegar), 2.5 g of plum vinegar per chicken needs to be mixed with feed daily, and therefore as much as 250 kg of plum vinegar must be mixed daily for 10,000 chickens, and additionally vinegar has a peculiar odor. In this respect, an MRE-derived solution according to the present invention is a liquid having no taste or odor, and therefore chickens are not picking or choosing. Furthermore, only 1 L of the liquid is required for 10,000 chickens, and natural immunity is activated; therefore an excellent secondary effect can be expected.

This secondary effect enables to nearly eliminate chickens that die of diseases, and it is also possible to make the dead chicken rate close to zero simply by improving the size of a cage. In fact, when we fed about 8120 chickens on drinking water added with the immunostimulating substance according to the present invention in a chicken farm having a large cage on the suburbs of Peking, the number of chicken that died of diseases or accidents was zero.

Moreover, in the method according to the present invention, the similar result can also be achieved by adding a solution containing the immunostimulating substance obtained above to poultry feed. In this case, the concentration of the immunostimulating substance relative to the entire poultry feed can be adjusted in a manner similar to that of drinking water described above.

Furthermore, the quality and productivity of eggs can be improved by using the immunostimulating substance according to the present invention for any birds that produce edible eggs in addition to chickens including quails, ducks, pigeons and ostriches.

Moreover, in the present invention, chickens capable of improving the quality and productivity of eggs include, but are not limited to, White Leghorn, Sakura, Momiji, ISA Brown, Dekalb Warren Sexalink, Harvard Comet, Shaver Starcross, Hisex Brown, Hyline Brown, Yellow Plymouth Rock, Rhode Island Red, Hoshino Cross, Norin Cross, Nagoya Cochin, Rock Horn, White Plymouth Rock, Minorca, Araucana and Silky Fowl

EXAMPLES

As described above, the method according to the present invention enables to not only dramatically enhance the quality and productivity of eggs but improve the taste of eggs as well. More specifically, what can be achieved includes reduced dead chicken rate, increased egg-laying rate and egg-laying days, improved Haugh unit, increased eggshell strength, increased yolk height, and increased number of days during which the yolk can be picked by chopsticks. Specific examples will be described below.

Example 1

Reduced Dead Chicken Rate

We raised 100,290 chickens each by using a normal breeding method (hereinafter referred to as the "normal breeding")

and a breeding method according to the present invention (hereinafter referred to as the "MRE breeding"). On the 300$^{th}$ days of breeding, 5,721 chickens died (dead chicken rate: 5.7%) in the normal breeding while only 1,685 chickens died (dead chicken rate: 1.7%) in the MRE breeding. This result shows that the MRE-derived immunostimulating substance according to the present application significantly lowers the dead chicken rate. Furthermore, the number of chickens that died of diseases was zero in the MRE breeding. Accordingly, it is possible to make the dead chicken rate close to zero by enlarging the size of a cage.

Example 2

Increased Egg-Laying Rate and Egg-Laying Days

When we fed chickens that no longer laid eggs on the MRE-derived immunostimulating substance according to the present application, those chickens started laying eggs. The egg-laying rate increased by about 5%.

Example 3

Improved Quality of Eggs

We divided 20 white leghorns into two groups, i.e., a group A (10 chickens) and a group B (10 chickens) and then mixed drinking water in the group B with a solution containing an MRE-derived immunostimulating substance by using a fluid delivery device, wherein the solution was diluted 1000-fold during the first month and 3000-fold on the second month and thereafter.

We picked up eggs laid by chickens in the group A and the group B nine times for two months, measured and recorded the Haugh unit, eggshell strength, yolk height yolk color and egg weight and then found the total each.

Table 2 shows the result, and a description of the result is given below.

1. Improved Haugh unit (HU): as table 2 shows, the average HU value of eggs in an comparative example (normal breeding) is 79.1 while the average HU value of eggs laid in the MRE breeding is 87.9 and the maximum average 93.4, showing a significant increase.

2. Increased yolk height: as table 2 shows, yolk height is 6.4 mm in a comparative example (normal breeding) while that of eggs laid in the MRE breeding is 7.9 mm and the maximum average 9.0 mm, showing a significant increase.

3. Increased eggshell strength: as table 2 shows, eggshell strength is 4.0 kg/cm$^2$ in a comparative example (normal breeding) while that of eggs laid in the MRE breeding is 4.4 kg/cm$^2$ and the maximum average 5.1 kg/cm$^2$, showing significantly enhanced strength.

4. Number of days during which the yolk can be picked with chopsticks: the yolk can no longer be picked on the 2$^{nd}$ day or the 3$^{rd}$ day in a comparative example (normal breeding) while the yolk of eggs laid in the MRE breeding can be picked even on the 6$^{th}$ day.

TABLE 2

|  |  | 1$^{st}$ | 2$^{nd}$ | 3$^{rd}$ | 4$^{th}$ | 5$^{th}$ | 6$^{th}$ | 7$^{th}$ | 8$^{th}$ | 9$^{th}$ | Average |
|---|---|---|---|---|---|---|---|---|---|---|---|
| Number of eggs measured |  | 10 | 10 | 10 | 10 | 10 | 10 | 10 | 10 | 10 | 90 |
| Haugh unit | Normal | 78.5 | 76.4 | 80.5 | 80.4 | 88.5 | 76.1 | 80.3 | 79.4 | 76.7 | 79.1 |
|  | MRE | 91.2 | 95.4 | 88.4 | 82.5 | 88.6 | 87.1 | 80.2 | 89.5 | 88.6 | 87.9 |
|  | (MAX) | 96.9 | 99.8 | 92.5 | 68.7 | 92.2 | 95.9 | 86.2 | 97.5 | 93.6 | 93.4 |
| Yolk height | Normal | 6.4 | 5.3 | 6.8 | 6.7 | 7.2 | 6.1 | 6.5 | 6.5 | 6.3 | 6.4 |
|  | MRE | 8.2 | 9.1 | 7.7 | 6.9 | 8.0 | 7.8 | 6.6 | 8.4 | 8.0 | 7.9 |
|  | (MAX) | 9.9 | 9.9 | 8.1 | 7.7 | 10.0 | 9.3 | 7.5 | 10.1 | 9.1 | 9.0 |
| Eggshell strength | Normal | 4.0 | 4.3 | 4.0 | 3.9 | 4.1 | 4.0 | 3.6 | 3.8 | 4.0 | 4.0 |
|  | MRE | 5.1 | 4.0 | 4.6 | 4.7 | 4.1 | 4.3 | 4.7 | 4.6 | 3.9 | 4.4 |
|  | (MAX) | 5.6 | 5.3 | 5.4 | 5.6 | 5.0 | 4.7 | 5.3 | 4.9 | 5.0 | 5.1 |
| Yolk color | Normal | 12.1 | 12.6 | 12.6 | 12.8 | 12.1 | 12.1 | 12.1 | 12.6 | 11.9 | 12.3 |
|  | MRE | 11.5 | 12.0 | 11.7 | 11.7 | 11.7 | 11.8 | 12.4 | 12.5 | 12.7 | 12.0 |
|  | (MAX) | 12.5 | 18.0 | 12.6 | 12.5 | 12.5 | 12.7 | 13.0 | 18.4 | 18.4 | 12.8 |
| Egg weight | Normal | 63.3 | 67.5 | 64.2 | 64.6 | 62.8 | 63.8 | 60.3 | 63.1 | 63.9 | 63.7 |
|  | MRE | 57.6 | 58.3 | 58.1 | 60.7 | 63.4 | 63.8 | 62.7 | 68.7 | 63.3 | 61.8 |
|  | (MAX) | 62.6 | 65.0 | 61.8 | 68.2 | 66.6 | 73.4 | 68.6 | 78.9 | 67.3 | 67.8 |

Example 4

Reduced Dead Chicken Rate, Increased Egg-Laying Rate and Reduced Egg Breakage Rate We conducted a comparative test by using two chicken houses in a chicken farm that was raising 155,000 chickens and producing eggs. We raised 6400 hens each in the chicken houses under the same conditions and provided ordinary water to hens in one chicken house (group A) as drinking water while drinking water in the other chicken house (group B) was mixed with a solution containing an MRE-derived immunostimulating substance by using a fluid delivery device, wherein the solution was diluted 1000-fold during the first month and 3000-fold on the second month and thereafter. Since 6400 hens drank about 1860 L of water daily on average, we mixed drinking water in the chicken house of the group B with 1.9 L of the solution containing an MRE-derived immunostimulating substance daily on the first month and 620 mL daily on the second month and thereafter.

As a result, the annual dead chicken rate was 6.94% in the normal breeding group A while the annual dead chicken rate in the group B provided with MRE drinking water was 2.19%, showing a significant decline. Additionally, hens in the group B rarely died of diseases: the main cause was accidental deaths arising out of a narrow cage.

The egg-laying rate also increased by 5.2% on average. When 380 days have passed after the start of breeding, the egg-laying rate was less than 71.3% in the group A while the group B maintained 82.6%. The annual egg breakage rate was 2.2% in the group A while it was 1.0% in the group B.

Example 5

Production of Immunostimulating Substance

MRE symbiotic bacteria are cultured by an ordinary culture method for aerophilic Gram-positive bacteria. A 1.2 m$^3$ culture aeration tank is charged with 1000 L of water, and then aeration is performed. To the culture aeration tank were added 3 kg of fish powder, 3 kg of rice bran, 1.6 kg of oil cake and 350 g of bouillon, and furthermore a proper amount of minerals such as magnesium sulfate and silica is added. Then, MRE symbiotic bacteria are added and then cultured while performing aeration such that the concentration of dissolved oxygen becomes 0.5-1.2 mg/under the culture conditions of pH 6.0-6.8 and a culture temperature of 25-35° C.

After waiting until bacteria grow enough and are stabilized, all of nourishing substances for MRE symbiotic bacteria are discontinued to place the culture liquid in a depleted state and aeration continued at 15-35° C., and then depletion of nitrogen components triggers sporulation of MRE symbiotic bacteria. After waiting until the culture liquid becomes more and more transparent, aeration (supply of oxygen) is stopped and then endospores starts precipitating all at once to give a transparent supernatant.

The supernatant thus obtained is filtrated with a membrane of 0.2 μm under reduced pressure to give an MRE decomposed solution containing an immunostimulating substance. Aeration may also be stopped after confirming the completion of sporulation under a phase difference microscope.

It goes without saying that the present invention is not limited to the abovementioned embodiment and can be modified in various manners without departing from the spirit of the invention.

What is claimed is:

1. A method for producing a hen egg having improved quality and productivity, the method comprising feeding a hen on supplemented feed obtained by adding to poultry feed an immunostimulating substance produced by cytolysis associated with spore formation of a symbiotic bacteria group that comprises *Bacillus Lysinibacillus fusiformis, Bacillus sonorensis, Lysinibacillus sp.,* and *Comamonas sp.* and/or on supplemented drinking water obtained by adding the immunostimulating substance to drinking water, wherein the immunostimulating substance is obtained by incubating the symbiotic bacteria group, placing a resultant culture medium under a starvation condition, thereby causing the symbiotic bacteria group to internally sporulate, and removing from the culture medium impurities containing the internally sporulated bacteria group.

2. The method according to claim 1, wherein the improved quality is improved Haugh unit, yolk height and eggshell strength.

3. The method according to claim 1, wherein the improved productivity is an improved dead chicken rate, an enhanced egg-laying rate and a reduced egg breakage rate.

4. The method according to claim 1, wherein the hen is selected from the group consisting of White Leghorn, Sakura, Momiji, ISA Brown, Dekalb Warren Sexalink, Harvard Comet, Shaver Starcross, Hisex Brown, Hyline Brown, Yellow Plymouth Rock, Rhode Island Red, Hoshino Cross, Norin Cross, Nagoya Cochin, Rock Hom, White Plymouth Rock, Minorca, Araucana and Silky Fowl.

5. The method according to claim 1, wherein the immunostimulating substance is added to the drinking water by a fluid delivery device.

* * * * *